(No Model.)
F. B. VINTER.
CONNECTION FOR FLUSHING DRAIN PIPES OF SINKS, WASHBASINS, &c
No. 536,769. Patented Apr. 2, 1895.
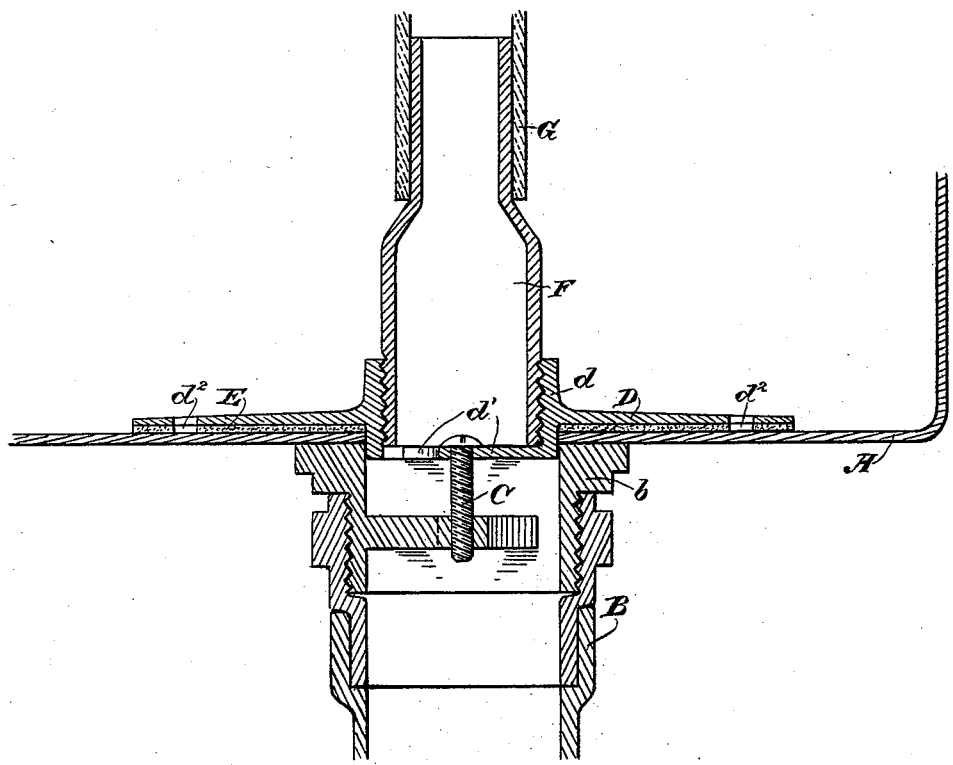

UNITED STATES PATENT OFFICE.

FRED BOWSKILL VINTER, OF SAN JOSÉ, CALIFORNIA.

CONNECTION FOR FLUSHING DRAIN-PIPES OF SINKS, WASHBASINS, &c.

SPECIFICATION forming part of Letters Patent No. 536,769, dated April 2, 1895.

Application filed October 11, 1894. Serial No. 525,630. (No model.)

*To all whom it may concern:*

Be it known that I, FRED BOWSKILL VINTER, a citizen of the United States, residing at San José, county of Santa Clara, State of California, have invented an Improvement in Connections for Flushing the Drain-Pipes of Sinks, Washbasins, Bath-Tubs, &c.; and I hereby declare the following to be a full, clear, and exact description of the same.

My invention relates to the general class of plumbing connections, and it consists of the constructions and combinations of parts which I shall hereinafter fully describe and specifically claim.

The object of my invention is to provide a simple and readily adjustable means for connecting a flushing or forcing pump with the drain or waste pipe, whereby the latter may be cleansed or opened out when clogged, in an easy, thorough and effective manner, the work being done by one man instead of the two ordinarily employed.

Referring to the accompanying drawing for a more complete explanation of my invention,—the figure is a section of my flushing connection as applied to a sink.

In the figure I have shown a sink A, the drain pipe B of which has, at its top, the usual sink coupling $b$, in which is the customary screw C which secures the strainer.

D is a plate or base having a central internally threaded hub $d$, and at its base, cross bars $d'$. A washer or gasket E lies on the under face of this plate or base. To apply this portion of the device to the sink, the screw C which secures the strainer is removed, and the plate D with its underlying washer E is laid down within the sink, and the screw is replaced, passing through the cross-bars $d'$, thereby securing the plate D firmly to the sink, right at the head or mouth of the drain pipe, the washer E forming a perfectly water tight joint. The washer or gasket may be of soft rubber or other suitable material, adapted to make the proper water tight connection between the base or plate and the waste or drain pipe.

F is the nipple, the base of which is screwed into the internally threaded hub $d$ of the plate D, and to this nipple is connected the hose G of a force pump unnecessary herein to show.

By the operation of the force pump the drain or waste pipe may be properly flushed to clean it out, or to open it if it has become clogged.

In some sinks the strainer is bolted on by bolts which continue through the sink to a clamp below which is made tight by a putty joint. To apply my device to such a sink, simply remove the bolts and secure the device in place of the strainer, the plate or flange D being for this purpose fitted with two holes $d^2$ to correspond with the holes in the sink through which the bolts pass to secure the strainer and clamp below.

Having thus described my invention, what I claim as new, and desire to secure by Letters Patent, is—

1. A connection for flushing the drain or waste pipes of sinks, wash-basins, bath-tubs, and the like, consisting of a plate or base adapted to fit within the vessel directly over the mouth of the drain or waste pipe, having an internally threaded opening and having a washer or gasket under it to form a tight joint therewith, means for securing and tightening the plate or base to its seat, and an externally threaded nipple fitted to the base, and adapted to be screwed to the internally threaded opening thereof for the attachment of the hose of a force pump.

2. A connection for flushing the drain or waste pipes of sinks, wash-basins, bath-tubs and the like, consisting of a flat plate or base adapted to be seated within the vessel over the mouth of the drain or waste pipe, and having an internally threaded central aperture communicating therewith, a washer or gasket on the under side of the plate or base for forming a tight joint, means for tightening the plate or base to its seat, and an externally threaded nipple fitted to the internally threaded central aperture of the plate or base and adapted to receive the hose connection of the hose pump.

3. A connection for flushing the drain or waste pipes of sinks, wash-basins, bath-tubs, and the like, consisting of a plate or base adapted to be seated in the vessel over the mouth of the drain or waste pipe, and having a central aperture communicating therewith and cross-bars in said aperture adapted to receive the strainer securing screw whereby the plate or base is secured and tightened in place, the washer or gasket under the plate or base for forming a tight joint, and the nipple screwed into the central aperture of the plate or base and adapted to receive the hose connection.

In witness whereof I have hereunto set my hand.

FRED BOWSKILL VINTER.

Witnesses:
WM. VINTER,
W. C. VINTER.